Inventor:
WERNER TH. SCHAURTE & HEINRICH LANGE
By C. P. Guepel
ATTORNEY

Patented Mar. 11, 1941

2,234,456

UNITED STATES PATENT OFFICE 2,234,456

APPARATUS FOR TESTING GOODS

Werner T. Schaurte, Schloss Lauvenburg, near Neuss-on-the-Rhine, and Heinrich Lange, Dusseldorf, Germany, assignors to Bauer & Schaurte, Neuss-on-the-Rhine, Germany, a corporation of Germany Application April 4, 1938, Serial No. 199,970
In Germany March 5, 1937

4 Claims. (Cl. 175—183)

The present invention relates to an apparatus for automatically testing staple-goods without destroying the articles being tested.

The object of the invention is to provide an apparatus for testing staple-goods or articles of mass production made of iron or other material without destroying such articles, that is to say, the object of the invention is to provide an apparatus which by means of an electromagnetic device automatically tests such articles of mass production with regard to their different properties; automatically indicates such properties so that they may be read off; simultaneously sorts or classifies such articles according to the differences of their properties, and also automatically measures and indicates the differences between the various articles on the basis of comparison. All these operations are carried out according to the invention without, at any moment of the testing and sorting, comparing or measuring and indicating any other contact occurring between the apparatus and the articles being tested other than superficial contact.

The apparatus according to the invention may be used for testing, etc., small iron ware and metal castings for building- and furniture-garnishments, for locks and for fastening members of iron or other metal, provided such goods or members are adapted to be individually treated, and are, with regard to their properties, to be manufactured exactly. The invention described hereinafter may be used in connection with raw pieces and semifinished products as well as with finished articles, regardless of whether the variations of any or all of their properties to be tested are great or small.

The nature of the invention will be evident by the fact that the means for obtaining the above indicated purpose is a combination of an automatically acting gripping appliance for the articles being tested with an automatic sorting device, an automatic indicating and reading off device respectively, and also of an automatic comparison and measuring device and a device for measuring the hardness of the material of the articles being tested.

In the accompanying drawings one construction according to the invention is shown by way of example.

In these drawings—

Figure 1:
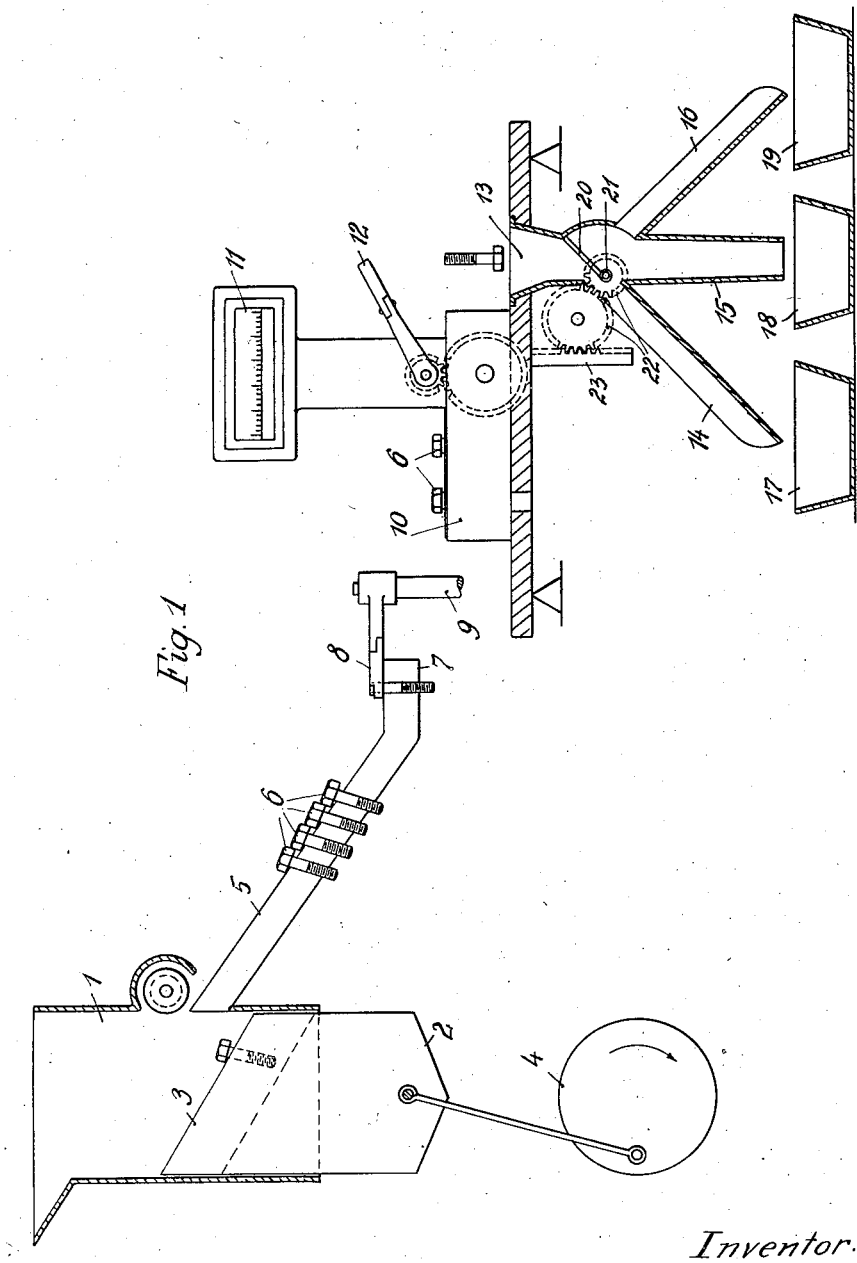
Figure 2:
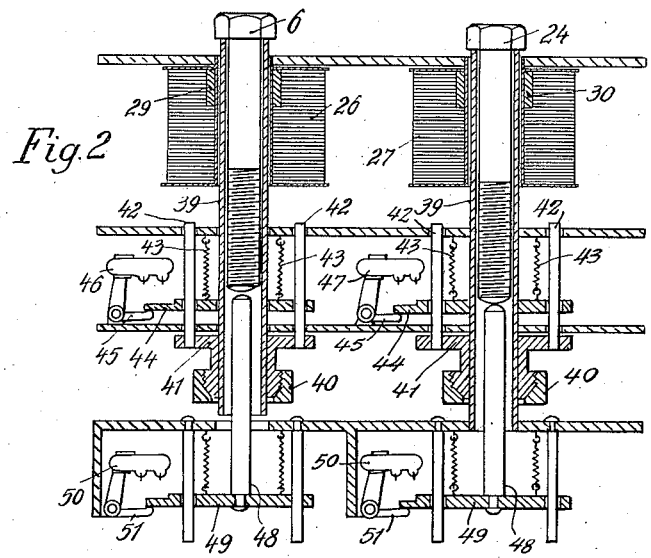
Figure 3:
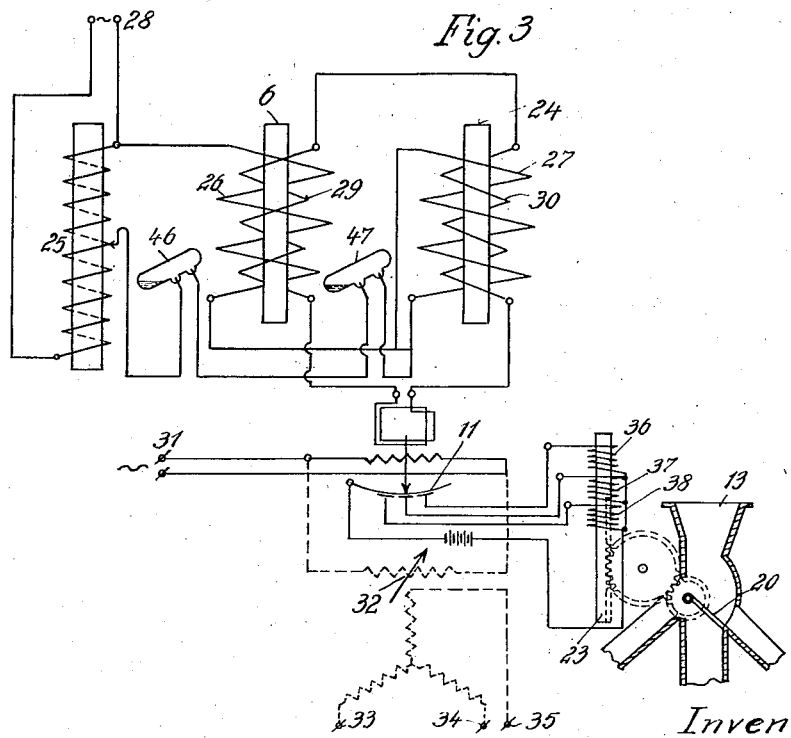
Figure 4:
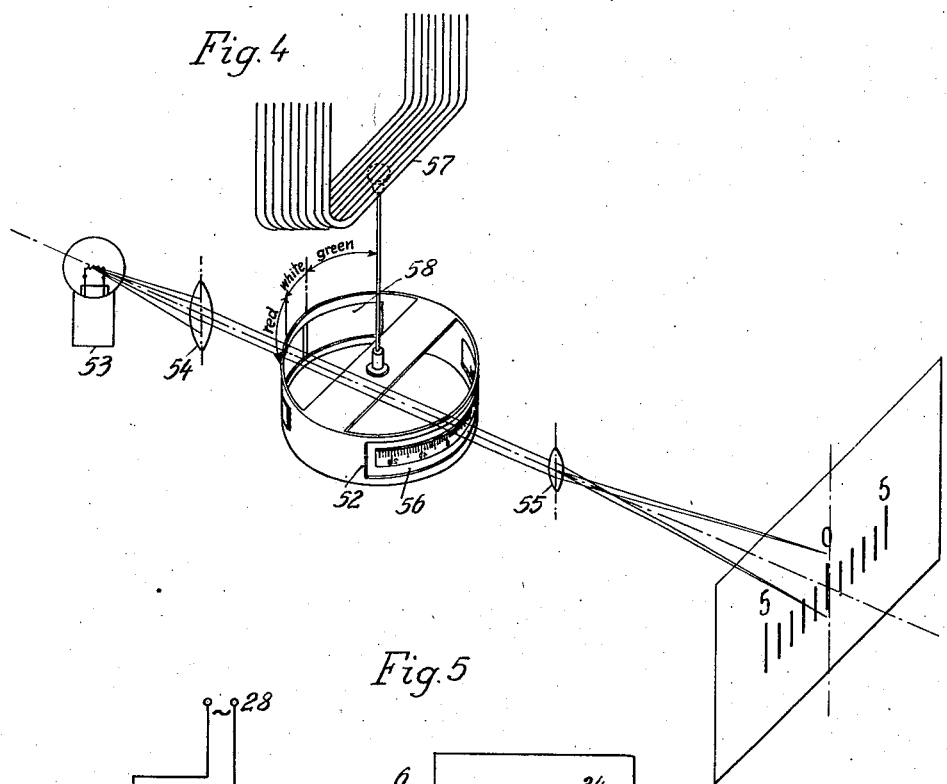
Figure 5:
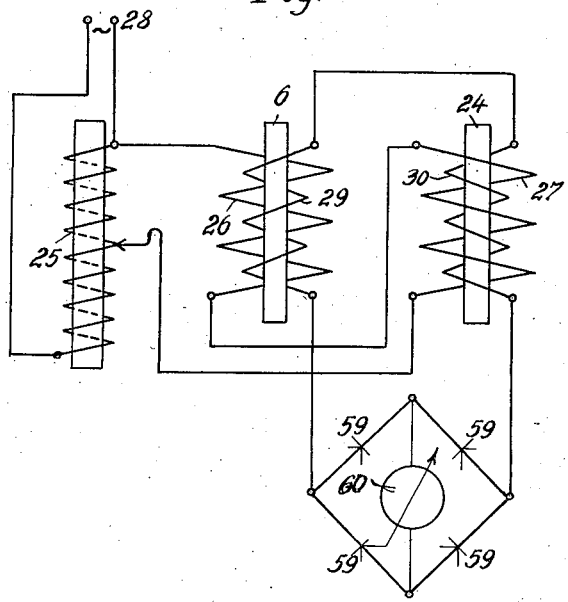

Fig. 1 is a diagrammatic side view partly in section of a device according to the invention, Fig. 2 shows a longitudinal section through the portion of the apparatus serving for electromagnetically testing the test pieces, Fig. 3 is a diagram of the electrical connections of this portion of the apparatus, Fig. 4 is a perspective sketchlike view of the portion of the apparatus according to the invention serving to indicate the test- and measuring results in a manner to be read off, and Fig. 5 is a diagrammatic sketch of a specially preferred modification of that portion of the apparatus, according to the invention, which serves to measure the property of the articles being tested.

The manufacture and use of screws has recently developed particularly to the point, that increasingly better grade materials are being used, since greater demands are being made for uniformity of the properties of the finished screws. This development results in the necessity of controlling the material used for the manufacture of the screws as well as the properties of the finished screws by a test apparatus operating without destroying the articles being tested, and making it possible to obtain information about the uniformity of the properties of such high grade screws made in mass production without destroying the articles being tested.

The standard of acceptance heretofore in respect to the mechanical properties of screws has been based on either tensile tests which completely destroyed the article being tested, or else it has been based on Brinell or Rockwell tests, which latter tests, it is true, do not completely destroy the article being tested, but they do require that an indentation be made in the surface of the article, whereby the appearance of the screw is affected and the finish of the article is removed.

The invention provides an apparatus which allows an automatic testing of screws with regard to their various properties with the aid of an electro-magnetic device, effecting simultaneously a sorting or classifying. According to the invention, the articles being tested are successively fed to an electro-magnetic test device which, in dependence on the test result, controls a sorting or classifying device to which the articles being tested are led by an automatically operating gripping appliance.

The electro-magnetic test device consists of a system of coils receiving the screw bolts, as well as an indicating device which, in relay connection controls a movable flap opening or closing the mouths of individual discharge channels into which the articles being tested are successively conveyed. The test apparatus according to the invention is based on the knowledge that the head of the screw at a suitable magnetization acts as a kind of counterpole, and that therefore the magnetization at the shaft of the screw is not altered, even with relatively ununiform heads of screws. By means of the device according to the invention, the sorting or classifying of screws in accordance with definite properties, as for instance hardness, state of thermal refining, length, diameter, carbon contents, flawlessness, alloy constitutency and so on, may be effected without further attendance.

As may be seen from Fig. 1, the articles being tested, for instance screw bolts, are introduced into a funnel 1 of an automatically operating feeding device, in which a vertically movable slide 2, having a guide channel 3, is arranged which is vertically moved up and down by a crank drive 4. If the slide 2 occupies its uppermost position, the channel 3 comes in alignment with a feeding bar 5 arranged opposite a lateral opening of the receptacle or funnel 1. The bolts 6 to be tested slide downwardly along this bar 5 until they reach a stop 7. At the lower end of the guide bar 5 a gripper 8 is provided which rotates about a vertical shaft 9. The gripper 8 always takes the lowermost bolt 6 off the bar 5 and feeds same above a receiving opening of the magnetic test system 10 in the range of which the bolt slides off the gripper 8 into the opening.

After the bolts have been tested in the magnetic test device and after the result has been ascertained by means of the indicating device 11 connected to the magnetic test system 10, an intermittently operating gripper 12, swingably arranged in a vertical plane, removes the bolt 6 from the receiving opening of the test device and feeds it to a collecting funnel 13 into which opens a number of discharge channels 14, 15, 16, which in turn lead to receptacles 17, 18, 19 arranged below these discharge channels. At the lower end of the funnel 13, i. e. at the upper end of the channels 14, 15, 16 a swingable flap 20 is provided which according to its position opens or closes the mouth of the discharge channels and therefore forms a switching means. The flap 20 is mounted upon an oscillating shaft 21 which by way of a toothed gear 22 is connected to a rack 23 of the indicating device 11 of the magnetic test device. The movement of the rack 23, and, therefore, also the adjustment of the flap 20, is effected in dependence on the position of the pointer of the indicating device 11.

The construction and the connections of the test device may be seen from Figures 2 and 3. The bolt 6 to be tested is, in a comparative method, compared with a normal bolt 24 of known properties consisting of a material of known composition. For this purpose both bolts 6 and 24 are each introduced into a system of coils consisting of a primary and a secondary winding. The connection of this arrangement is as follows:

By way of a slide transformer 25 two coils 26 and 27 are connected to an alternating current supply 28. These coils 26 and 27 serve for magnetizing the test piece 6 and the normal piece 24. Around each of the pieces 6 and 24 secondary coils 29 and 30, respectively, are provided which are connected in series opposite the direction of the flow of current. The secondary voltage at the ends of the secondary coil corresponds to the difference of the test inductions associated with the amplitude permeabilities at field intensities smaller than the coercive forces of the two articles being tested. By "amplitude permeability"

is meant the permeability ascertained from the magnitude $$\frac{b \text{ max.}}{h \text{ max.}}$$

in which connection $h$ max. is the field intensity which is used in the test and which always remains smaller than the coercive force of the articles being tested. This difference which allows conclusions regarding the properties of the bolts, is measured by a highly sensitive indicating instrument 11. In the construction shown by way of example the measuring is effected by an alternating current dynamometer deflecting to both sides. The connection according to Fig. 3 shows a stationary coil through which flows an alternating current at 31. In the alternating field produced by this coil a second coil at the indicating instrument 11 is rotatably arranged. In the drawings the coil occupies the zero position. The proper phase position of the current in the stationary coil and in the rotatable coil of the indicating instrument 11 is adjusted by a phase shifter 32 connected at 33, 34, 35 to a three-phase current supply. Of course other suitable indicating devices may be used. The indicating instrument 11 in turn serves for controlling the switching means or flap 20 arranged in the collecting funnel 13 in accordance with the test result obtained. For this purpose the rack 23 may, for instance, be connected to an armature of a magnet the position of which is altered by energizing the various coils 36, 37, 38. The exciting coils 36, 37, 38 are arranged in a separate circuit and are switched in, for instance, by contacts controlled by the indicating instrument 11, eventually by drop yokes or light relays in accordance with the position occupied by the pointer.

Details about the construction of the test device are shown in Fig. 2. The bolt 6 to be tested and the comparison bolt 24 are arranged in a vertical receiving opening of the respective coils 26 and 29 and 27 and 30 respectively. In the opening of the coil a sleeve 39 of non-conductive material is provided, both ends of which are open. The diameter of the sleeve 39 preferably is chosen somewhat greater than the diameter of the bolt, so that impurities, such as scale and the like, may drop downwardly without contaminating or soiling the test device proper. The lower end of the sleeve 39 is, by way of clamping cone 40, exchangeably arranged in a holder 41 vertically guided by pins 42. The holder 41 and the sleeve 39 clamped thereto are drawn upwardly by means of springs 43. At the left hand end the holder 41 carries a horizontal projection 44 which engages a toggle lever 45 which in turn carries a switching or rocking key 46. The test device for the comparison bolt 24 may be constructed in the same manner, and is adapted to operate a switching or rocking mercury switch 47. The mercury switches 46 and 47 are, as shown in Fig. 3, arranged in the circuit of the primary coils 26 and 27. When the test bolt is introduced into the sleeve 39, the latter and its holder 41 are moved downwardly under the influence of the weight of the bolt. On the downward movement the toggle lever 45 is swung by the lateral projection 44 of the holder 41, whereby the rocking mercury switch 46 closes its circuit. In the same manner the comparison bolt 24 operates the rocking mercury switch 47, shown in Figure 3 but not in Figure 2, so that the indicating instrument 11 is switched in only if a test bolt and a comparison bolt are inserted in the device. The test instrument, furthermore, effects adjustment of the switching member or flap 20 in the manner described above, so that the bolt 6 introduced into the collecting funnel 13 is fed into the corresponding receptacle. The operation of the test coils by means of the weight of the inserted bolts has the advantage, that fluctuations in the length of the shaft remain without appreciable influence upon the result of the measurements. In other words, the weight and not the length of the bolts as was heretofore proposed determines the result. If the length of the shaft itself also is to be tested, special stops 48 are provided at the lower end of the movable sleeve 39. These stops 48 are connected to holders 49 the construction of which is similar to that of holder 41. The holder 49 may, in the same manner as the holder 41, operate another switching or rocking mercury switch 50 by way of a toggle lever 51, so that another circuit is closed, shown in Figure 2 but not shown in Figure 3.

The rectifiers may, in a most simple manner, be combined with the alternating current measuring instrument by employing as a measuring instrument a dynamometer which is energized synchronously with the voltage to be measured.

The device for reading off the measuring results which forms part of the apparatus according to the invention may, if desired, be formed as shown in Fig. 4. That is to say, this device may be so constructed, that the result of the measuring indicated in a scale in the device may optically be projected upon a screen, whereupon the number corresponding to the deflection of the measuring instrument appears on a mark fixed to the screen. The scale may be dyed with colours characterizing the different kinds of the deflections.

Fig. 4 shows the essential members necessary to attain the desired object. The image of the scale 52 is, in a well known manner, produced by the optical elements 53, 54, 55 by means of a diapositive 56, obtained in a photographic or mechanical manner, which is arranged on the coil 57 of the apparatus.

In a suitable manner, the scale in the apparatus may be dyed in different colours by providing coloured films 58, so that the result of the test may be visible at long distances by the action of the colours. If the width of these colour filters, for instance red and green colour filters, is so chosen, that an uncoloured strip, for instance a white strip, appears between the filters, due deviations from the zero position may be indicated by the white colour.

If by the use of the apparatus according to the invention the hardness of the article being tested is to be determined and thereby the test pieces are to be subjected to the influence of a magnetizing field strength, a modification of the apparatus is particularly suitable in which the magnetizing field strength is smaller than the coercive force of the material of the test pieces.

It is well known, that the mechanical hardness of a ferro-magnetic material is to a large extent parallel to its magnetic hardness. In the literature quite a number of statements are to be found to the effect that, by using this method, the hardness of materials may magnetically be measured, but in spite of this, this method has not yet been really adopted in practice. With the methods used heretofore the magnetic hardness is given by the magnetic property of the material and is measured by the latter. As is well known, a measure for the coercive force is obtained, if the ferro-magnetic material is subjected to a magnetic alternating field; the induction values, passed thereby and usually called the hysteresis-loop, are plotted and therefrom the magnetic field strength of the material still present with the field strength zero, or the opposed value of the exciting field strength respectively, is determined, which is necessary to again demagnetize the material. The surface enclosed by the hysteresis-loop indicates by its size the amount of energy which is lost by the magnetic reversal of the material in an alternating field, i. e. which is transformed into heat in the material.

As, moreover, other magnetic properties, as other permeability, hysteresis-loss and watt loss respectively, have a certain but far reaching uncleared connection with the hardness factor, experiments have repeatedly been made to determine the magnetic hardness on the basis of these factors. However, these connections between the various magnetic properties are so uncertain, that their connection with the factors to be measured always is to be determined by repeated preliminary tests.

If in the connection shown in Fig. 5 rectifiers and direct current instruments are replaced by an oscilliograph, an apparatus as often used already for magnetic tests is obtained. The tests carried out with the use of rectifiers and direct current instruments, however, resulted, in contradistinction to the measurements made with oscillographs, in the surprising fact that with the use of smallest field strengths proportionality was present between amplitude permeability and hardness of the articles being tested. This result was obtained by the fact that by the use of direct current instruments the sensitivity is substantially higher, so that measurements could be made with field strengths with which measurements free of objection could not be made with the oscillograph. Moreover, by the oscillograph the difference of the internal stress of the two test pieces $$\left(\frac{db_2}{dt} - \frac{db_1}{dt}\right)$$

is measured in which connection $b_1$ and $b_2$ are the momentary values of the test inductions, whereas with the direct current instruments $b_2$ max.—$b_1$ max. is determined. The current in the direct current instruments is proportioned to the time rate of change of flux in the pieces being compared. This value is capable of being evaluated and has rendered possible this observation.

According to the invention the uncertainties and difficulties occurring in this respect hitherto are overcome by the fact that an apparatus is provided, the magnetic field strength of which is smaller than the coercive force of the test piece to be measured, because it has been ascertained by experiments that then a substantial favourable change in the connections mentioned occurs. The induction values resulting with the use of such a device are measured with regard to the induction values of a normal or relative test piece treated in the same way, preferably in such a manner that the difference of the test inductions associated with the amplitude permeabilities at field intensities smaller than the coercive forces of the two test pieces is indicated. It will then be seen that with the magnitude of the magnetizing field strength chosen according to the invention in connection with alternating current, magnetizing the amplitude permeability was strictly proportional to the hardness of the article being tested. With regard to known test devices, having defects and operating with uncertainties, this means the great advantage that all these uncertainties are completely removed if, according to the invention, the magnetizing is chosen only to such an extent that the hysteresis laws given by Rayleigh for small field strengths are still valid. In this way only exists the exact proportionality between the amplitude permeability and the hardness of the test piece.

For the use of the device according to the invention in connection with the above mentioned magnetic field strength, the electric connection shown in Fig. 5 is suitable, which corresponds to the connection shown in Fig. 3.

With the high increase of the sensitiveness of modern instruments it is possible to still sufficiently measure exactly the difference of the inductions by means of rectifiers 59 and direct current instrument 60 with the smallest magnetizing field strength. With constant magnetizing field strength this differential value of the induction is directly proportional to the difference of the amplitude permeabilities.

An apparatus preferably to be connected to an alternating current supply has been described, but it is evident that in principle the method may be carried out with direct current as well as with alternating current, and even with current of higher frequency. Practically, alternating current will come into consideration only for the apparatus shown in the invention.

We have described an embodiment of our invention, but it will be clear that changes may be made within the principle of the invention described, without departing from the scope of the subjoined claims.

What we claim is:

1. In a device for testing staple goods of iron or other metal, without affecting the surfaces, the combination of comparative electric apparatus, one for a normal piece and one for the piece to be tested, means in said apparatus for the magnetizing of both of the pieces with the same amplitude permeability at a low intensity of field less than the coercive force, said magnetization being only to such an extent that the hysteresis laws for small field strengths are still valid, and means for measuring each of said magnetizations, said hardness and field intensity less than the coercive force being exactly proportional to each other.

2. In a device for testing staple goods of iron or other metal, without affecting the surfaces, the combination of electric apparatus, one for the normal piece, and one for the piece being tested, an alternating current circuit supply, a magnetizing coil for each apparatus connected with said supply, a secondary coil for each magnetizing coil, the secondary coils being connected in series, in a direction opposite that of the magnetizing coils, both of said coils subjecting each of the two pieces to the same magnetization only with an amplitude permeability at a low intensity of the field less than the coercive force, and means measuring the magnetizations, said hardness and field intensity less than the coercive force being exactly proportional to each other.

3. In a device for determining the hardness of ferro-magnetic articles, without affecting the surfaces, the combination of comparative electric apparatus each having magnetic means for the simultaneous magnetizing of a normal piece and of a test piece, each with the same field intensity and at a field intensity less than the coercive force, means subjecting the said test piece and said normal piece to induction at said field intensity, said hardness and field intensity less than the coercive force being exactly proportional to each other and means for measuring the magnetizations.

4. In a device for determining the hardness of ferro-magnetic articles, without affecting the surfaces, the combination of comparative electric apparatus each having magnetic means for the simultaneous magnetizing of a normal piece and of a test piece, each with the same field intensity and at a field intensity less than the coercive force, and means consisting of rectifiers and a direct current instrument for measuring the difference of the magnetizations in the piece being tested and in the normal piece, said hardness and field intensity less than the coercive force being exactly proportional to each other.

WERNER TH. SCHAURTE.
HEINRICH LANGE.